(12) United States Patent
Takahashi (10) Patent No.: US 10,216,072 B2
(45) Date of Patent: Feb. 26, 2019

(54) ZOOM LENS AND IMAGE PROJECTION APPARATUS

(71) Applicant: CANON KABUSHIKI KAISHA, Tokyo (JP)

(72) Inventor: Makoto Takahashi, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/025,228

(22) Filed: Jul. 2, 2018

(65) Prior Publication Data

US 2019/0011814 A1 Jan. 10, 2019

(30) Foreign Application Priority Data

Jul. 6, 2017 (JP) .................................. 2017-132433

(51) Int. Cl.
*G03B 21/14* (2006.01)
*G03B 5/02* (2006.01)

(52) U.S. Cl.
CPC ............. *G03B 21/142* (2013.01); *G03B 5/02* (2013.01); *G03B 2205/0046* (2013.01)

(58) Field of Classification Search
CPC .................. G03B 21/14; G03B 21/142; G03B 2205/0046; G03B 2205/0053; G02B 15/14; G02B 15/16; G02B 15/161; G02B 15/163; G02B 15/167; G02B 15/173; G02B 15/02

See application file for complete search history.

(56) References Cited

U.S. PATENT DOCUMENTS

| | | | | |
|---|---|---|---|---|
| 5,600,489 A | * | 2/1997 | Ueda | G02B 15/177 359/679 |
| 9,086,560 B2 | | 7/2015 | Inoko | |
| 9,348,125 B2 | | 5/2016 | Imaoka | |
| 2013/0308105 A1 | * | 11/2013 | Kubota | G02B 15/177 353/85 |
| 2016/0139383 A1 | | 5/2016 | Ichimura | |

FOREIGN PATENT DOCUMENTS

JP 2014134567 A 7/2014

* cited by examiner

*Primary Examiner* — Sultan Chowdhury
(74) *Attorney, Agent, or Firm* — Rossi, Kimms & McDowell LLP (57) ABSTRACT

A zoom lens comprising a plurality of lens units, in which a distance between adjacent lens units is variable in a magnification variation. The plurality of lens units include, in order from an enlargement conjugate side to a reduction conjugate side, a first lens unit that has a negative refractive power and that is fixed for the magnification variation, a second lens unit, a third lens unit, a fourth lens unit, a fifth lens unit, a sixth lens unit, and a seventh lens unit, each of which moves for the magnification variation, and an eighth lens unit that has a positive refractive power and that is fixed for the magnification variation.

12 Claims, 7 Drawing Sheets

ZOOM LENS AND IMAGE PROJECTION APPARATUS

BACKGROUND OF THE INVENTION

Field of the Invention

The present invention relates to a projection lens having a zooming function for use with an image projection apparatus.

Description of the Related Art

A projection lens for use with an image projection apparatus (projector) is required for a high-resolution performance that enables a high-resolution image to be projected and a magnification varying (zooming) function that can arbitrarily adjust the projected image size. Japanese Patent Laid-Open No. ("JP") 2014-134567 discloses a projection lens that moves five lens units for a magnification variation.

However, the conventional projection lens, such as the projection lens disclosed in JP 2014-134567, has difficulties in maintaining the high-resolution performance in an overall zooming region from a wide-angle end to a telephoto end. In other words, the resolution performance is significantly different between the wide-angle end and the telephoto end.

SUMMARY OF THE INVENTION

The present invention provides a zoom lens and an image projection apparatus, which can provide a high-resolution performance in an overall zooming region.

A zoom lens according to one aspect of the present invention includes a plurality of lens units, in which a distance between adjacent lens units is variable in a magnification variation, wherein the plurality of lens units include, in order from an enlargement conjugate side to a reduction conjugate side, a first lens unit that has a negative refractive power and that is fixed for the magnification variation, a second lens unit, a third lens unit, a fourth lens unit, a fifth lens unit, a sixth lens unit, and a seventh lens unit, each of which moves for the magnification variation, and an eighth lens unit that has a positive refractive power and that is fixed for the magnification variation.

Further features of the present invention will become apparent from the following description of exemplary embodiments with reference to the attached drawings.

DESCRIPTION OF THE EMBODIMENTS

Referring now to the accompanying drawings, a description will be given of embodiments according to the present invention. Before first to third embodiments (numerical examples 1 to 3) are explained, a description will now be given of matters common to each embodiment with reference to FIGS. 1, 4, and 7.

Figure 1:
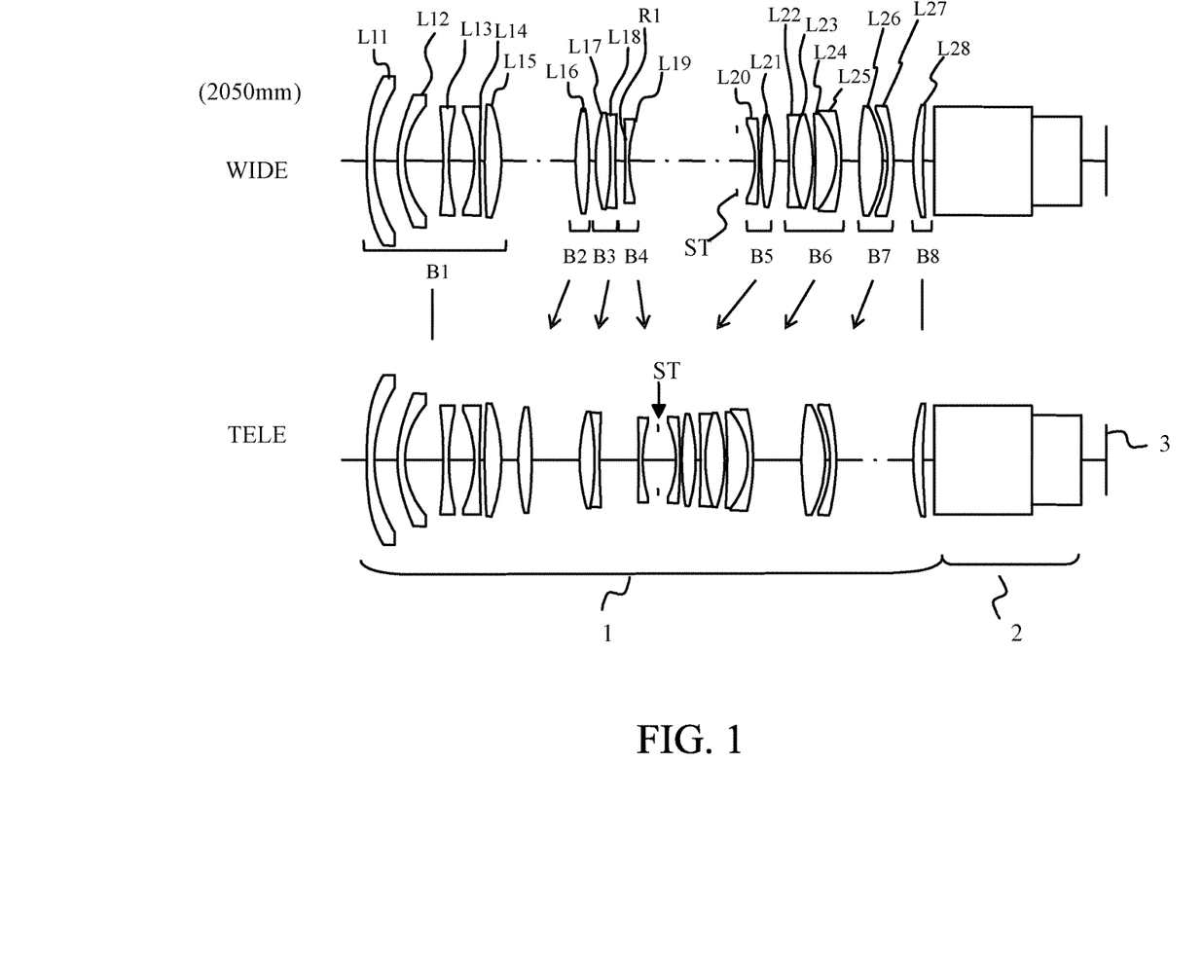
FIG. 1 is a sectional view of a structure of a zoom lens according to a first embodiment of the present invention.
Figure 4:
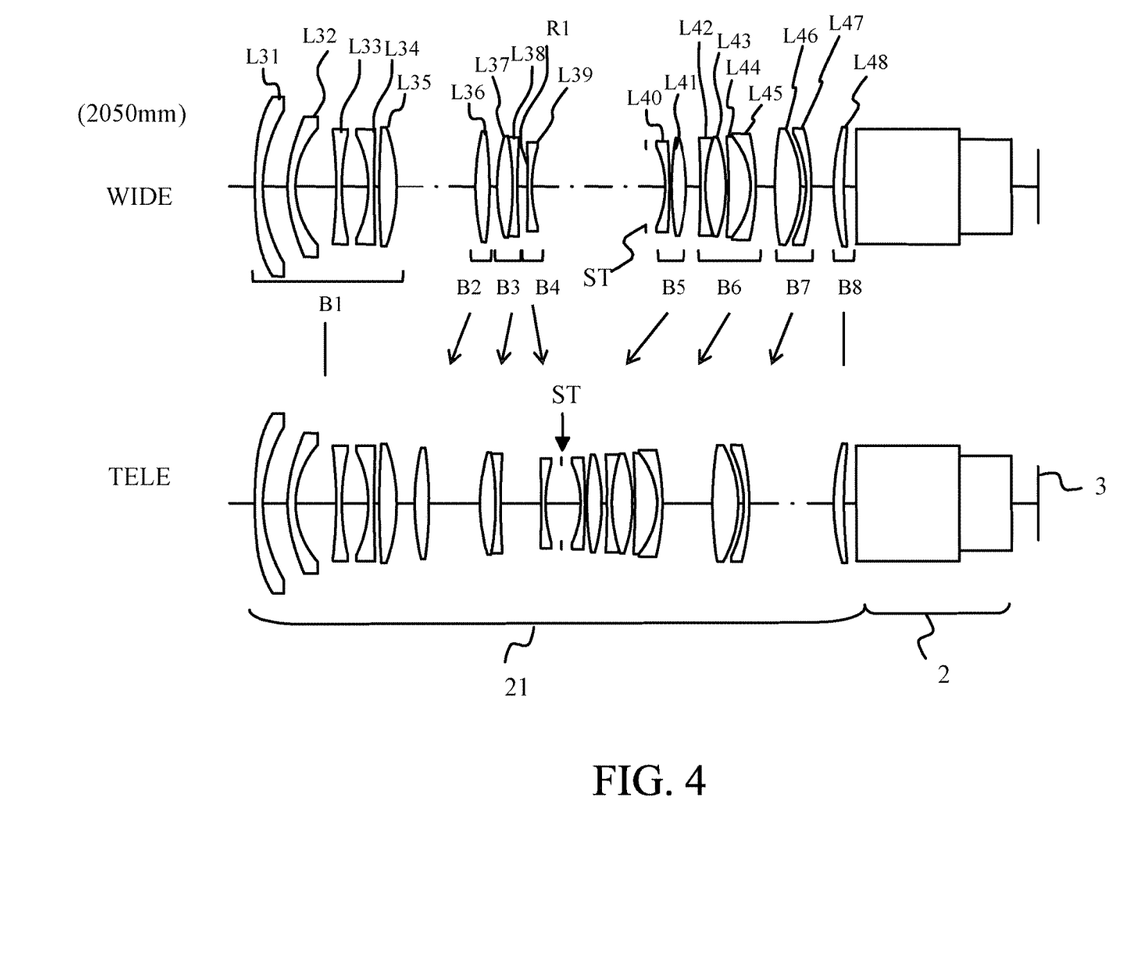
FIG. 4 is a sectional view of a structure of a zoom lens according to a second embodiment of the present invention.
Figure 7:
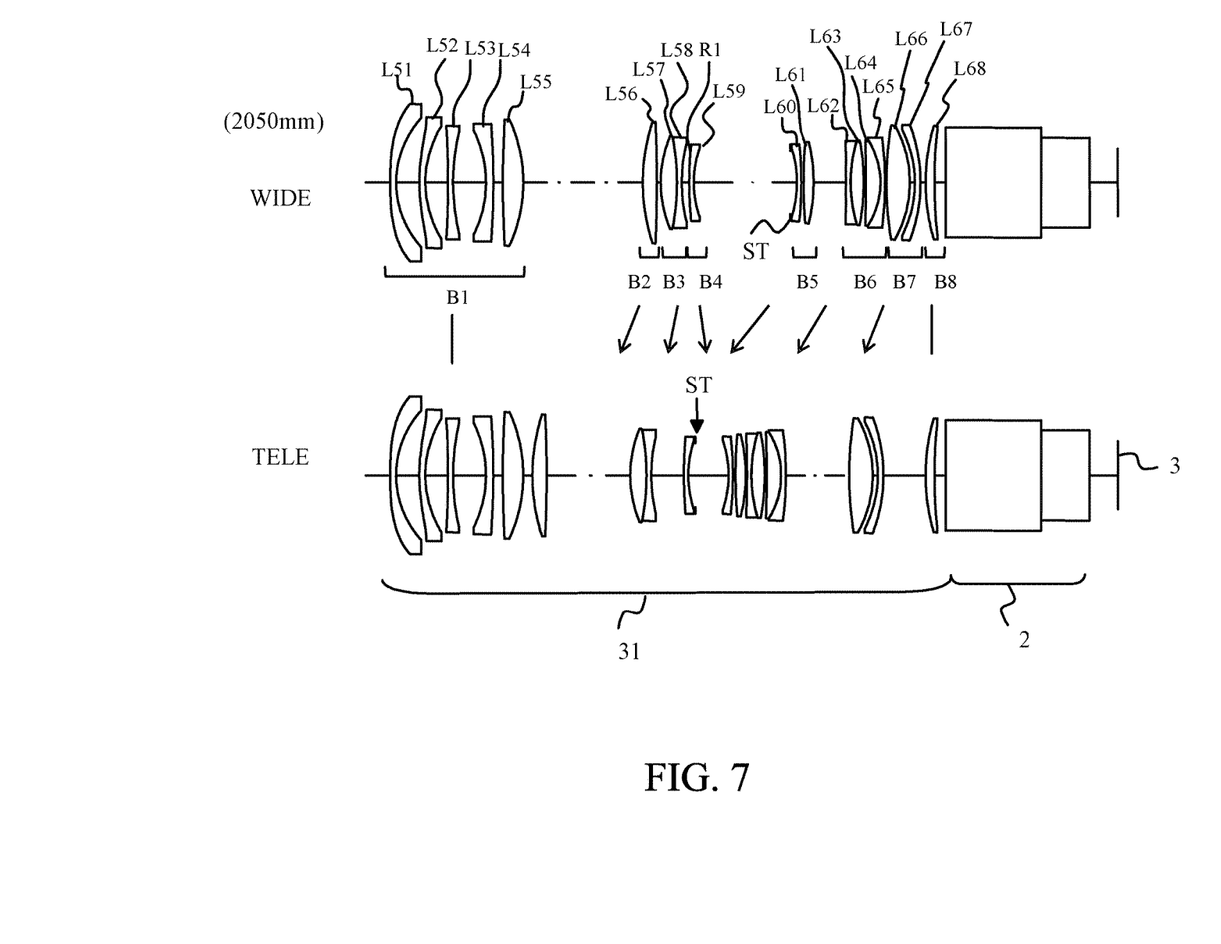
FIG. 7 is a sectional view of a structure of a zoom lens according to a third embodiment of the present invention.

Each zoom lens illustrated in FIGS. 1, 4, and 7 is used for a projection lens that projects light from a reduction conjugate side (the following light modulation element side) on the right side in each figure to an enlargement conjugate side (the following target plane side) on the left side in each figure. Each zoom lens includes a plurality of lens unit in which an interval or distance between adjacent lens units changes in the optical axis direction in a magnification variation.

The distance between the adjacent lens units, as used herein, means, for example, a distance between a first lens unit B1 and a second lens unit B2, a distance between a third lens unit B3 and a fourth lens unit B4, etc., as will be described later. In other words, a boundary between the lens units is located between the lens units which changes for the magnification variation. Changing the distance between the adjacent lens units may be changing a distance between a fixed lens unit and a movable lens unit for the magnification variation, such as the distance between the first lens unit B1 and the second lens unit B2. In the illustrative zoom lens in each embodiment, the plurality of lens unit include eight lens units.

The lens unit according to each embodiment of the present invention may include one or more lenses.

FIGS. 1, 4, and 7 illustrate an optical configuration of a wide-angle end (Wide) and a telephoto end (Tele) in each zoom lens. The zoom lens includes, in order from an enlargement conjugate side to a reduction conjugate side, a first lens unit B1 having a negative refractive power, a second lens unit B2 having a positive refractive power, a third lens unit B3 having a positive refractive power, and a fourth lens unit B4 having a negative refractive power. The zoom lens further includes a fifth lens unit B5 having a positive refractive power, a sixth lens unit B6 having a positive or negative refractive power, a seventh lens unit B7 having a positive refractive power, and an eighth lens unit B8 having a positive refractive power. An aperture stop (diaphragm) ST is provided between the fourth lens unit B4 and the fifth lens unit B5.

For the magnification variation, the first lens unit B1 and the eighth lens unit B8 are unmovable (fixed), and the second, third, fourth, fifth, and sixth lens units B2 to B6 move in the optical axis direction so as to draw different loci as illustrated by arrow directions. More specifically, for the magnification variation from a wide-angle side (wide-angle end) to a telephoto side (telephoto end), the second, third, fifth, sixth, and seventh lens units B2, B3, B5, B6, and B7 move to the enlargement conjugate side. On the other side, the fourth lens unit B4 moves to the reduction conjugate side.

In this structure, the shape of the fourth lens unit as the negative lens may satisfy the following conditional expression (1). This structure provides the zoom lens 1 with a good optical performance, such as a high-resolution performance in an overall zooming region from the wide-angle end to the telephoto end.

$$-0.2 \leq \varphi B4r1/\varphi w \leq 0.3 \quad (1)$$

In the expression (1), $\varphi w$ is a refractive power of the overall zoom lens system at the wide-angle end, and $\varphi B4r1$ is a refractive power of a lens surface R1 closest to the enlargement conjugate side in the fourth lens unit B4. When $\varphi B4r1/\varphi w$ is higher than the upper limit in the expression (1), the distortion is overcorrected. When $\varphi B4r1/\varphi w$ is lower than the lower limit, the distortion is undercorrected. Either case cannot provide a good optical performance.

A conditional expression (1)' may be satisfied which narrows the range of the expression (1). The upper limit of the expression (1)' may be lower than 0.

$$-0.1 \leq \varphi B4r1/\varphi w \leq 0 \quad (1)'$$

Since it is necessary to provide a space for an optical element, such as a color combining prism, between the projection lens (zoom lens 1) for the projector and a light modulation element 3, as illustrated in FIG. 1, the zoom lens 1 needs a back focus that is long to some extent. Hence, the zoom lens 1 may satisfy the following conditional expression (2).

$$-0.7 \leq \varphi 1/\varphi w \leq -0.1 \quad (2)$$

In the expression (2), $\varphi 1$ is a refractive power of the first lens unit B1. When the condition of the expression (2) is satisfied, the overall zooming region can secure a sufficient back focus.

A conditional expression (2)' may be satisfied which narrows the range of the expression (2).

$$-0.6 \leq \varphi 1/\varphi w \leq -0.2 \quad (2)'$$

When the refractive power of the fourth lens unit satisfies the conditional expression (3), the zoom lens can have a good optical performance in an overall zooming region.

$$-0.6 \leq \varphi 4/\varphi w < 0 \quad (3)$$

In the expression (3), $\varphi 4$ is a refractive power of the fourth lens unit B4. When $\varphi 4/\varphi w$ is located outside of a range between the upper limit and the lower limit in the expression (3), the field curvature change for the magnification variation cannot be restrained.

A conditional expression (3)' may be satisfied which narrows the range of the expression (3).

$$-0.4 \leq \varphi 4/\varphi w \leq -0.2 \quad (3)'$$

An aperture stop ST located between the fourth lens unit B4 and the fifth lens unit B5 may be moved so as to satisfy the following expression (4) and to draw a locus different from those of the second to seventh lens units B2 to B7 for the magnification variation. This configuration can restrain changes of the brightness (F-number) for the magnification variation.

$$0.8 \leq Fnot/Fnow \leq 1.2 \quad (4)$$

In the expression (4), Fnow is Fno of the zoom lens at the wide-angle end, and Fnot is Fno of the zoom lens at the telephoto end.

A conditional expression (4)' may be satisfied which narrows the range of the expression (4).

$$0.9 \leq Fnot/Fnow \leq 1.1 \quad (4)'$$

When each of the second lens unit B2 and the fourth lens unit B4 includes one lens, the structure of the moving lens unit can be made simple and lightweight.

Each embodiment can realize an approximately telecentric zoom lens having the good optical performance in the entire angle of field and having few changes of the resolution performance in the overall zooming region (or maintaining the high-resolution performance). In particular, the above effects can be more easily obtained by satisfying at least one of the expressions (1) to (4).

The structure of the zoom lens in each embodiment is merely illustrative, and the aperture stop ST is not limited to a position between the fourth and fifth lens units B4 and B5. The function similar to the aperture stop ST may be substituted by a barrel etc.

First Embodiment

FIG. 1 illustrates a structure of the zoom lens 1 according to a first embodiment of the present invention at a projection distance of 2050 mm. The zoom lens 1 according to this embodiment includes, in order from the enlargement conjugate side to the reduction conjugate side, the above first to eighth lens units B1 to B8. According to this embodiment, the sixth lens unit B6 has a positive refractive power. The aperture stop ST moves together with the fifth lens unit B5 for the magnification variation.

The first lens unit B1 includes, in order from the enlargement conjugate side to the reduction conjugate side, five lenses or negative, negative, negative, negative and positive lenses L11 to L15. The second lens unit B2 includes one positive lens L16. The third lens unit B3 includes, in order from the enlargement conjugate side to the reduction conjugate side, two lenses or positive and negative lenses L17 and L18. The fourth lens unit B4 includes one negative lens L19. The fifth lens unit B5 includes, in order from the enlargement conjugate side to the reduction conjugate side, two lenses or negative and positive lenses L20 and L21. The sixth lens unit B6 includes, in order from the enlargement conjugate side to the reduction conjugate side, four lenses or negative, positive, positive, and negative lenses L22 to L25. The seventh lens unit B7 includes, in order from the enlargement conjugate side to the reduction conjugate side, two lenses or positive and negative lenses L26 and L27. The eighth lens unit B8 includes one positive lens L28.

In FIG. 1, reference numeral 2 denotes an optical system that includes a color combining prism etc., reference numeral 3 denotes a light modulation element, such as a liquid crystal panel and a digital micro mirror device. The optical system 2 leads the light modulated by the light modulation element 3 to the projection lens (zoom lens 1). This is true of the other embodiments, which will be described later.

Table 1 summarizes numerical examples according to this embodiment. As indicated by (C) in Table 1, this embodiment satisfies the conditional expressions (1) to (4).

Figure 2:
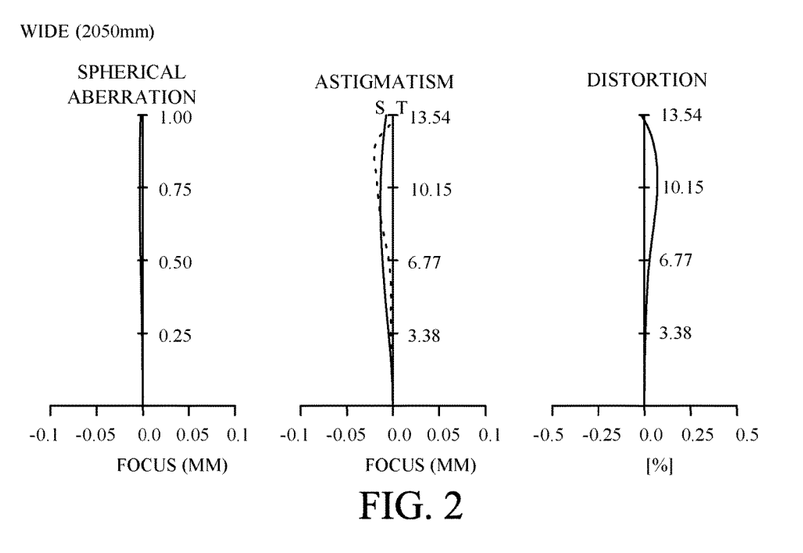
FIG. 2 is an aberrational diagram of the zoom lens according to the first embodiment at a wide-angle end and a projection distance of 2050 mm.
Figure 3:
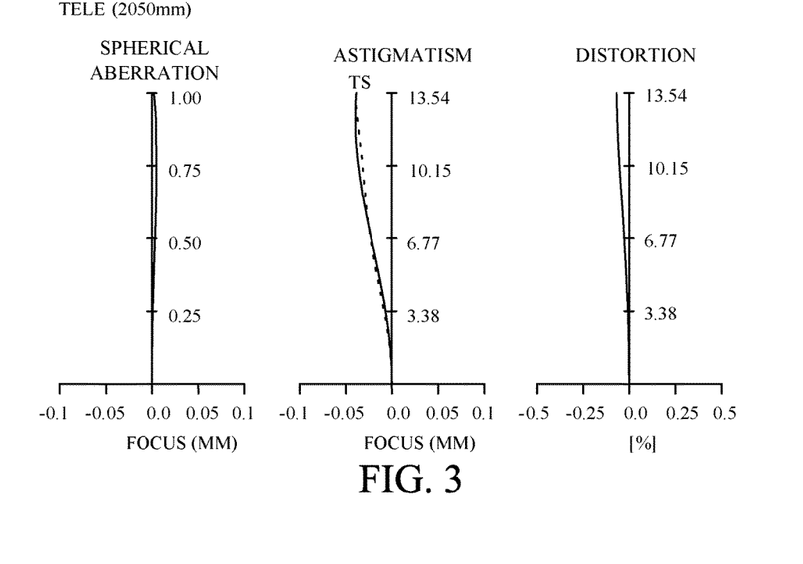
FIG. 3 is an aberrational diagram of the zoom lens according to the first embodiment at a telephoto end and a projection distance of 2050 mm.

FIG. 2 illustrates a longitudinal aberrational diagram of the zoom lens 1 according to this embodiment at the wide-angle end and the projection distance of 2050 mm. FIG. 3 illustrates a longitudinal aberrational diagram of the zoom lens 1 at the telephoto end and the projection distance of 2050 mm. These figures illustrate the spherical aberration and the distortion for the d-line, and the astigmatism on the meridional image plane (T) and sagittal image plane (S). This is true of the other embodiments, which will be described later.

Second Embodiment

FIG. 4 illustrates a structure of a zoom lens 21 according to a second embodiment of the present invention at a projection distance of 2050 mm. The zoom lens 21 according to this embodiment includes, in order from the enlargement conjugate side to the reduction conjugate side, the above first to eighth lens units B1 to B8. According to this embodiment, the sixth lens unit B6 has a negative refractive power. The aperture stop ST moves together with the fifth lens unit B5 for the magnification variation.

The first lens unit B1 includes, in order from the enlargement conjugate side to the reduction conjugate side, five lenses or negative, negative, negative, negative and positive lenses L31 to L35. The second lens unit B2 includes one positive lens L36. The third lens unit B3 includes, in order from the enlargement conjugate side to the reduction conjugate side, two lenses or positive and negative lenses L37 and L38. The fourth lens unit B4 includes one negative lens L39. The fifth lens unit B5 includes, in order from the enlargement conjugate side to the reduction conjugate side, two lenses or negative and positive lenses L40 and L41. The sixth lens unit B6 includes, in order from the enlargement conjugate side to the reduction conjugate side, four lenses or negative, positive, positive, and negative lenses L42 to L45. The seventh lens unit B7 includes, in order from the enlargement conjugate side to the reduction conjugate side, two lenses or positive and negative lenses L46 and L47. The eighth lens unit B8 includes one positive lens L48.

Table 2 summarizes numerical examples according to this embodiment. As indicated by (C) in Table 2, this embodiment satisfies the conditional expressions (1) to (4).

Figure 5:
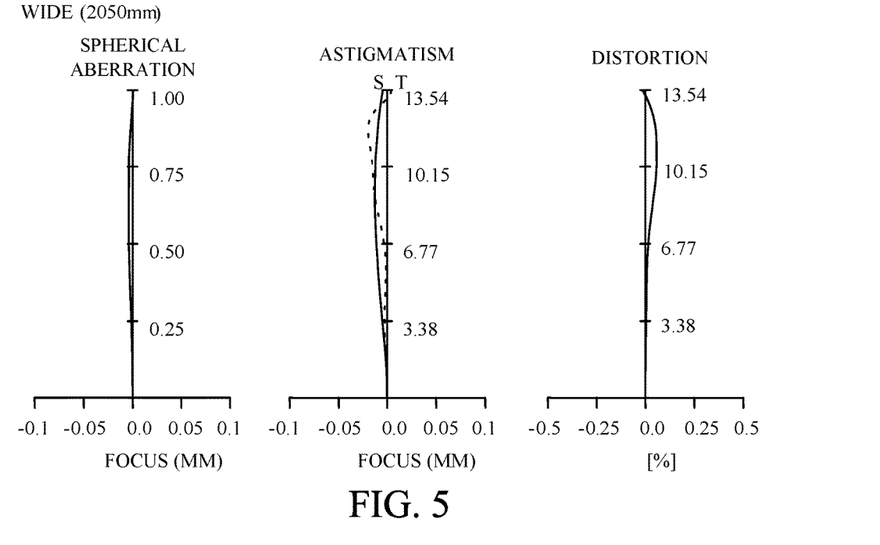
FIG. 5 is an aberrational diagram of the zoom lens according to the second embodiment at a wide-angle end and a projection distance of 2050 mm.
Figure 6:
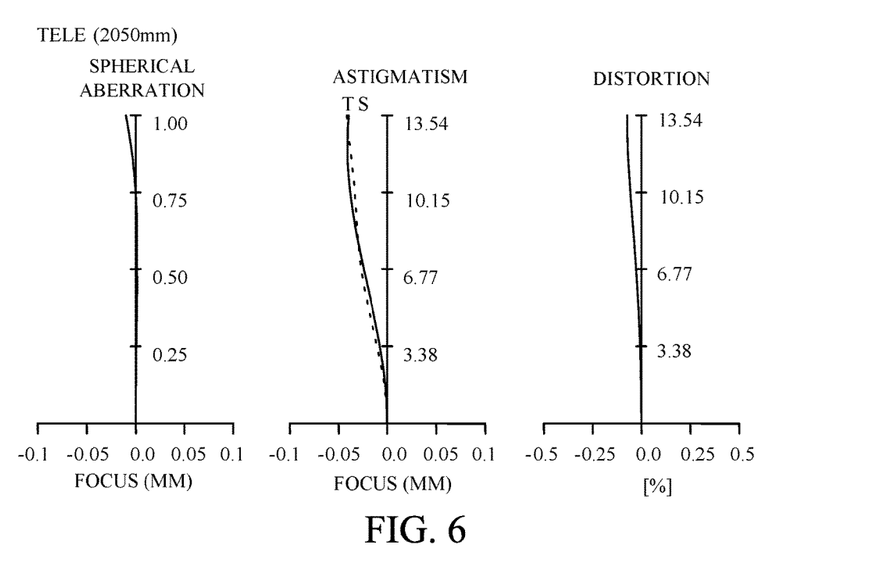
FIG. 6 is an aberrational diagram of the zoom lens according to the second embodiment at a telephoto end and a projection distance of 2050 mm.

FIG. 5 illustrates a longitudinal aberrational diagram of the zoom lens 21 according to this embodiment at the wide-angle end and the projection distance of 2050 mm. FIG. 6 illustrates a longitudinal aberrational diagram of the zoom lens 21 at the telephoto end and the projection distance of 2050 mm.

Third Embodiment

FIG. 7 illustrates a structure of a zoom lens 31 according to a third embodiment of the present invention at a projection distance of 2050 mm. The zoom lens 31 according to this embodiment includes, in order from the enlargement conjugate side to the reduction conjugate side, the above first to eighth lens units B1 to B8. According to this embodiment, the sixth lens unit B6 has a positive refractive power. The aperture stop ST moves so as to draw a locus different from those of any of the lens units for the magnification variation.

The first lens unit B1 includes, in order from the enlargement conjugate side to the reduction conjugate side, five lenses or negative, negative, negative, negative and positive lenses L51 to L55. The second lens unit B2 includes one positive lens L56. The third lens unit B3 includes, in order from the enlargement conjugate side to the reduction conjugate side, two lenses or positive and negative lenses L57 and L58. The fourth lens unit B4 includes one negative lens L59. The fifth lens unit B5 includes, in order from the enlargement conjugate side to the reduction conjugate side, two lenses or negative and positive lenses L60 and L61. The sixth lens unit B6 includes, in order from the enlargement conjugate side to the reduction conjugate side, four lenses or negative, positive, positive, and negative lenses L62 to L65. The seventh lens unit B7 includes, in order from the enlargement conjugate side to the reduction conjugate side, two lenses or positive and negative lenses L66 and L67. The eighth lens unit B8 includes one positive lens L68.

Table 3 summarizes numerical examples according to this embodiment. As indicated by (C) in Table 3, this embodiment satisfies the conditional expressions (1) to (4).

Figure 8:
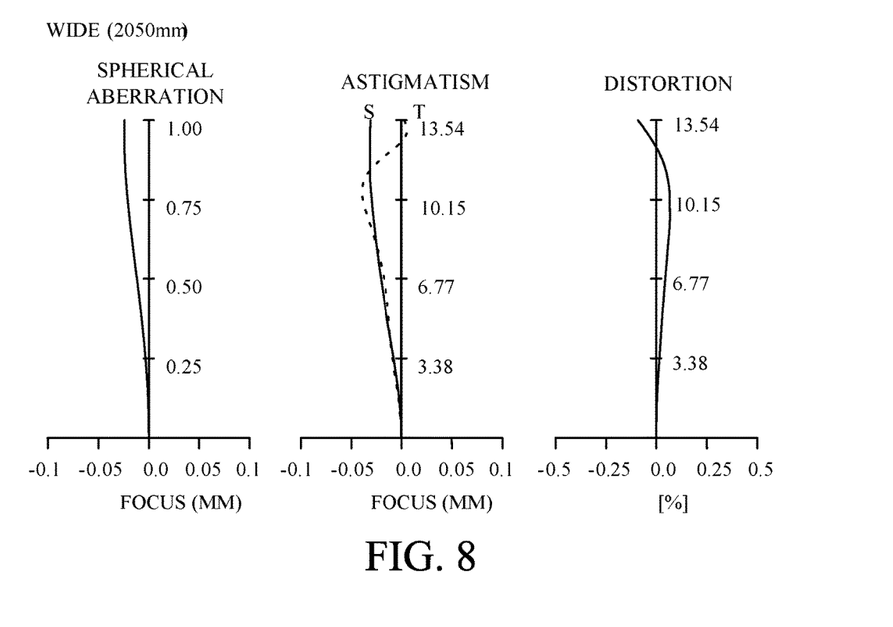
FIG. 8 is an aberrational diagram of the zoom lens according to the third embodiment at a wide-angle end and a projection distance of 2050 mm.
Figure 9:
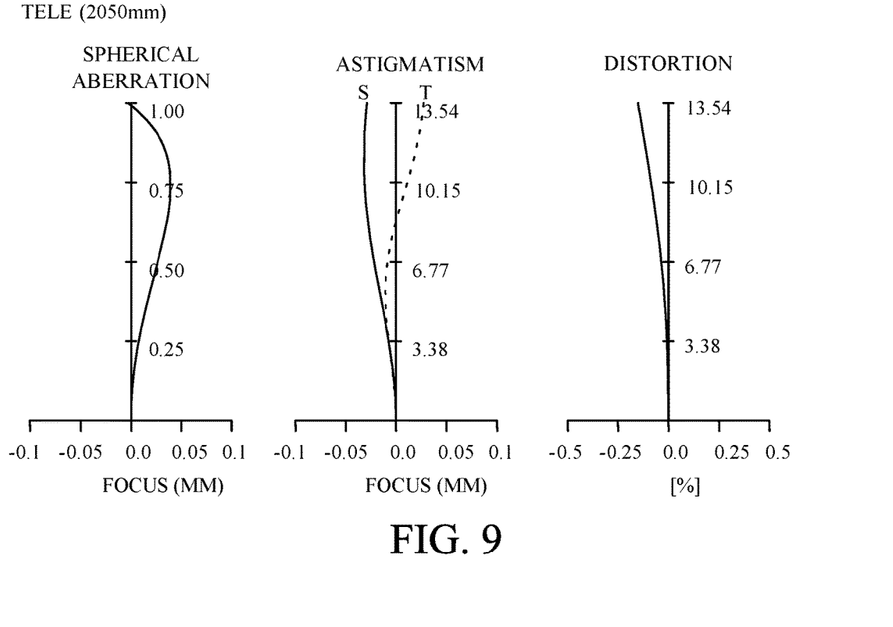
FIG. 9 is an aberrational diagram of the zoom lens according to the third embodiment at a telephoto end and a projection distance of 2050 mm.

FIG. 8 illustrates a longitudinal aberrational diagram of the zoom lens 31 according to this embodiment at the wide-angle end and the projection distance of 2050 mm. FIG. 9 illustrates a longitudinal aberrational diagram of the zoom lens 31 at the telephoto end and the projection distance of 2050 mm.

Numerical Example

The following table will summarize numerical examples corresponding to the first to third embodiments. In each table, (A) represents a lens configuration, f represents a focal length (mm), and F represents an aperture ratio. In addition, ri represents a radius of curvature on an i-th plane from the object side (reduction conjugate side), and di represents a distance (mm) between the i-th plane and the (i+1)-th plane. Moreover, ni and vi are a refractive index and Abbe number for the d-line of the i-th optical member. ST is a position of the stop.

An asterisked plane on the left side has an aspherical shape represented by the following function. (B) shows an aspherical coefficient. In this function, y is a coordinate in a radial direction, z is a coordinate in an optical axis direction, k is a conic coefficient. In addition, e-x represents "×10$^{-x}$."

$$z(y)=(y^2/ri)/[1+\{1-(1+k)(y^2/ri^2)\}^{1/2}]+Ay^4+By^6+Cy^8+Dy^{10}+Ey^{12}+Fy^{14}+Gy^{16}$$

(C) in each table indicates values of the expressions (1) to (4) in each numerical example.

TABLE 1

NUMERICAL EXAMPLE 1

(A) LENS CONFIGURATION

|  | Wide-Angle | Telephoto |
|---|---|---|
| f | 22.75 | 39.94 |
| F | 2.60 | 2.97 |
| Angle of Field | 30.7 | 18.7 |
| Lens Overall Length | 220.0 | |
| BF | 72.6 | |
| Zoom Ratio | 1.76 | |

TABLE 1-continued

NUMERICAL EXAMPLE 1

|   |   |   |   |   |
|---|---|---|---|---|
| * | r1 = 269.66 | d1 = 3.00 | n1 = 1.516 | ν1 = 64.1 |
|   | r2 = 53.82 | d2 = 9.10 |   |   |
| * | r3 = 46.93 | d3 = 3.00 | n2 = 1.773 | ν2 = 49.6 |
|   | r4 = 32.60 | d4 = 15.17 |   |   |
|   | r5 = −168.33 | d5 = 2.10 | n3 = 1.497 | ν3 = 81.5 |
|   | r6 = 82.31 | d6 = 10.17 |   |   |
|   | r7 = −43.60 | d7 = 2.00 | n4 = 1.497 | ν4 = 81.5 |
|   | r8 = 409.66 | d8 = 2.00 |   |   |
|   | r9 = 283.69 | d9 = 6.60 | n5 = 1.694 | ν5 = 50.8 |
|   | r10 = −65.53 | d10 = Variable |   |   |
|   | r11 = 90.91 | d11 = 5.30 | n6 = 1.678 | ν6 = 55.3 |
|   | r12 = −147.87 | d12 = Variable |   |   |
|   | r13 = 65.53 | d13 = 5.90 | n7 = 1.717 | ν7 = 29.5 |
|   | r14 = −100.81 | d14 = 1.90 | n8 = 1.805 | ν8 = 25.5 |
|   | r15 = 251.33 | d15 = Variable |   |   |
|   | r16 = −656.56 | d16 = 1.60 | n9 = 1.717 | ν9 = 47.9 |
|   | r17 = 50.86 | d17 = Variable |   |   |
| ST | r18 = ∞ | d18 = 7.20 |   |   |
|   | r19 = −34.87 | d19 = 1.60 | n10 = 1.606 | ν10 = 43.7 |
|   | r20 = −193.81 | d20 = 0.75 |   |   |
|   | r21 = 111.02 | d21 = 5.40 | n11 = 1.808 | ν11 = 22.8 |
|   | r22 = −65.81 | d22 = Variable |   |   |
|   | r23 = −339.98 | d23 = 1.80 | n12 = 1.855 | ν12 = 24.8 |
|   | r24 = 56.76 | d24 = 7.70 | n13 = 1.516 | ν13 = 64.1 |
|   | r25 = −56.76 | d25 = 1.03 |   |   |
|   | r26 = −232.28 | d26 = 8.20 | n14 = 1.607 | ν14 = 56.8 |
|   | r27 = −29.11 | d27 = 2.00 | n15 = 1.855 | ν15 = 24.8 |
|   | r28 = −83.70 | d28 = Variable |   |   |
|   | r29 = 128.06 | d29 = 9.30 | n16 = 1.439 | ν16 = 94.7 |
|   | r30 = −45.05 | d30 = 2.00 |   |   |
|   | r31 = −44.43 | d31 = 2.40 | n17 = 1.673 | ν17 = 38.2 |
|   | r32 = −85.14 | d32 = Variable |   |   |
|   | r33 = 78.89 | d33 = 3.80 | n18 = 1.946 | ν18 = 18.0 |
|   | r34 = 221.59 | d34 = 4.50 |   |   |
|   | r35 = ∞ | d35 = 38.70 | n19 = 1.516 | ν19 = 64.0 |
|   | r36 = ∞ | d36 = 19.50 | n20 = 1.841 | ν20 = 25.0 |
|   | r37 = ∞ | d37 = 9.87 |   |   |

Unit distance in magnification variations (mm) (2050 mm)

| Unit distance | Wide-angle | Telephoto |
|---|---|---|
| d10 | 29.53 | 6.71 |
| d12 | 2.51 | 19.10 |
| d15 | 3.93 | 15.47 |
| d17 | 42.49 | 5.96 |
| d22 | 5.78 | 2.00 |
| d28 | 6.94 | 19.27 |
| d32 | 7.76 | 30.43 |

(B) Aspherical Coefficient

|   | K | A | B | C |
|---|---|---|---|---|
| r1 | 0 | 5.59393E−06 | −4.43720E−09 | 5.58718E−12 |
| r3 | 0 | −3.84698E−06 | 1.10923E−09 | −6.65578E−13 |

|   | D | E | F | G |
|---|---|---|---|---|
| r1 | −6.07763E−15 | 5.10934E−18 | −2.58504E−21 | 5.88571E−25 |
| r3 | −2.22195E−16 | 0 | 0 | 0 |

(C) Values of Conditional Expressions

| | |
|---|---|
| (1) | −0.025 |
| (2) | −0.51 |
| (3) | −0.35 |
| (4) | 1.14 |

Various Numerical Values

| | |
|---|---|
| $\varphi 1$ | −0.0223 |
| $\varphi 4$ | −0.015 |
| $\varphi w$ | 0.044 |
| $\varphi B4\ r1$ | −0.0011 |
| n | 1.717 |

TABLE 1-continued

| NUMERICAL EXAMPLE 1 | |
|---|---|
| Fnow | 2.60 |
| Fnot | 2.97 |

TABLE 2

NUMERICAL EXAMPLE 2

(A) LENS CONFIGURATION

| | | Wide-angle | Telephoto |
|---|---|---|---|
| | f | 22.75 | 39.95 |
| | F | 2.10 | 2.40 |
| | Angle of Field | 30.7 | 18.7 |
| | Lens Overall Length | 220.0 | |
| | BF | 72.6 | |
| | Zoom Ratio | 1.76 | |

| | | | | |
|---|---|---|---|---|
| * | r1 = 270.00 | d1 = 3.00 | n1 = 1.516 | ν1 = 64.1 |
| | r2 = 55.10 | d2 = 9.15 | | |
| * | r3 = 47.76 | d3 = 3.00 | n2 = 1.773 | ν2 = 49.6 |
| | r4 = 32.52 | d4 = 15.12 | | |
| | r5 = −165.03 | d5 = 2.10 | n3 = 1.497 | ν3 = 81.5 |
| | r6 = 85.07 | d6 = 9.92 | | |
| | r7 = −43.38 | d7 = 2.00 | n4 = 1.497 | ν4 = 81.5 |
| | r8 = 410.26 | d8 = 2.00 | | |
| | r9 = 295.69 | d9 = 6.57 | n5 = 1.694 | ν5 = 50.8 |
| | r10 = −65.07 | d10 = variable | | |
| | r11 = 90.37 | d11 = 5.27 | n6 = 1.678 | ν6 = 55.3 |
| | r12 = −149.07 | d12 = variable | | |
| | r13 = 65.54 | d13 = 5.78 | n7 = 1.717 | ν7 = 29.5 |
| | r14 = −105.92 | d14 = 1.82 | n8 = 1.805 | ν8 = 25.5 |
| | r15 = 265.23 | d15 = variable | | |
| | r16 = −535.15 | d16 = 1.60 | n9 = 1.717 | ν9 = 47.9 |
| | r17 = 51.25 | d17 = variable | | |
| ST | r18 = ∞ | d18 = 7.21 | | |
| | r19 = −34.79 | d19 = 1.60 | n10 = 1.606 | ν10 = 43.7 |
| | r20 = −207.38 | d20 = 0.75 | | |
| | r21 = 109.65 | d21 = 5.47 | n11 = 1.808 | ν11 = 22.8 |
| | r22 = −64.52 | d22 = variable | | |
| | r23 = −318.90 | d23 = 1.80 | n12 = 1.855 | ν12 = 24.8 |
| | r24 = 57.21 | d24 = 7.66 | n13 = 1.516 | ν13 = 64.1 |
| | r25 = −57.21 | d25 = 1.02 | | |
| | r26 = −230.21 | d26 = 8.20 | n14 = 1.607 | ν14 = 56.8 |
| | r27 = −28.77 | d27 = 2.00 | n15 = 1.855 | ν15 = 24.8 |
| | r28 = −83.44 | d28 = variable | | |
| | r29 = 131.50 | d29 = 9.66 | n16 = 1.439 | ν16 = 94.7 |
| | r30 = −44.09 | d30 = 2.00 | | |
| | r31 = −43.36 | d31 = 2.10 | n17 = 1.673 | ν17 = 38.2 |
| | r32 = −81.27 | d32 = variable | | |
| | r33 = 77.43 | d33 = 3.82 | n18 = 1.946 | ν18 = 18.0 |
| | r34 = 210.39 | d34 = 4.50 | | |
| | r35 = ∞ | d35 = 38.70 | n19 = 1.516 | ν19 = 64.0 |
| | r36 = ∞ | d36 = 19.50 | n20 = 1.841 | ν20 = 25.0 |
| | r37 = ∞ | d37 = 9.86 | | |

Unit distance in magnification variation (mm) (2050 mm)

| Unit distance | Wide-angle | Telephoto |
|---|---|---|
| d10 | 29.57 | 6.71 |
| d12 | 2.74 | 19.29 |
| d15 | 3.82 | 15.20 |
| d17 | 42.51 | 5.90 |
| d22 | 5.46 | 2.00 |
| d28 | 7.00 | 18.81 |
| d32 | 8.25 | 31.44 |

(B) Aspherical coefficient

| | K | A | B | C |
|---|---|---|---|---|
| r1 | 0 | 5.50043E−06 | −4.30592E−09 | 5.60260E−12 |
| r3 | 0 | −3.76733E−06 | 1.00492E−09 | −5.47304E−13 |

TABLE 2-continued

NUMERICAL EXAMPLE 2

| | D | E | F | G |
|---|---|---|---|---|
| r1 | −6.38660E−15 | 5.58265E−18 | −2.90423E−21 | 6.72507E−25 |
| r3 | −2.42846E−16 | 0 | 0 | 0 |

(C) Values of Conditional Expressions

| | |
|---|---|
| (1) | −0.030 |
| (2) | −0.51 |
| (3) | −0.35 |
| (4) | 1.14 |

Various Numerical Values

| | |
|---|---|
| $\varphi 1$ | −0.0224 |
| $\varphi 4$ | −0.015 |
| $\varphi w$ | 0.044 |
| $\varphi B4\,r1$ | −0.0013 |
| n | 1.717 |
| Fnow | 2.10 |
| Fnot | 2.40 |

TABLE 3

NUMERICAL EXAMPLE 3

(A) LENS CONFIGURATION

| | Wide-angle | Telephoto |
|---|---|---|
| f | 22.71 | 39.97 |
| F | 2.40 | 2.40 |
| Angle of Field | 30.7 | 18.7 |
| Lens Overall Length | 220.0 | |
| BF | 74.1 | |
| Zoom Ratio | 1.76 | |

| | | | | |
|---|---|---|---|---|
| * | r1 = 155.38 | d1 = 2.45 | n1 = 1.516 | v1 = 64.14 |
| | r2 = 38.11 | d2 = 9.36 | | |
| * | r3 = 71.96 | d3 = 2.40 | n2 = 1.773 | v2 = 49.60 |
| | r4 = 42.69 | d4 = 9.24 | | |
| | r5 = −331.77 | d5 = 2.00 | n3 = 1.497 | v3 = 81.54 |
| | r6 = 89.77 | d6 = 13.26 | | |
| | r7 = −46.70 | d7 = 3.00 | n4 = 1.497 | v4 = 81.54 |
| | r8 = −298.55 | d8 = 3.79 | | |
| | r9 = 423.34 | d9 = 8.33 | n5 = 1.694 | v5 = 50.81 |
| | r10 = −59.29 | d10 = variable | | |
| | r11 = 78.23 | d11 = 5.78 | n6 = 1.678 | v6 = 55.34 |
| | r12 = −462.24 | d12 = variable | | |
| | r13 = 48.97 | d13 = 6.60 | n7 = 1.717 | v7 = 29.52 |
| | r14 = −89.87 | d14 = 1.90 | n8 = 1.805 | v8 = 25.46 |
| | r15 = 67.11 | d15 = variable | | |
| | r16 = 161.42 | d16 = 1.80 | n9 = 1.717 | v9 = 47.93 |
| | r17 = 42.26 | d17 = variable | | |
| ST | r18 = ∞ | d18 = variable | | |
| | r19 = −44.03 | d19 = 1.80 | n10 = 1.606 | v10 = 43.71 |
| | r20 = −131.54 | d20 = 1.00 | | |
| | r21 = 183.30 | d21 = 4.15 | n11 = 1.808 | v11 = 22.76 |
| | r22 = −66.30 | d22 = variable | | |
| | r23 = −499.69 | d23 = 1.80 | n12 = 1.855 | v12 = 24.80 |
| | r24 = 58.38 | d24 = 5.41 | n13 = 1.516 | v13 = 64.14 |
| | r25 = −83.92 | d25 = 0.75 | | |
| | r26 = −569.37 | d26 = 5.84 | n14 = 1.607 | v14 = 56.82 |
| | r27 = −32.52 | d27 = 1.93 | n15 = 1.855 | v15 = 24.80 |
| | r28 = −135.34 | d28 = variable | | |
| | r29 = 142.74 | d29 = 9.56 | n16 = 1.439 | v16 = 94.66 |
| | r30 = −46.02 | d30 = 2.00 | | |
| | r31 = −45.83 | d31 = 2.30 | n17 = 1.673 | v17 = 38.15 |
| | r32 = −63.50 | d32 = variable | | |
| | r33 = 81.22 | d33 = 3.56 | n18 = 1.946 | v18 = 18.0 |
| | r34 = 203.31 | d34 = 4.50 | | |
| | r35 = ∞ | d35 = 38.70 | n19 = 1.516 | v19 = 64.0 |
| | r36 = ∞ | d36 = 19.50 | n20 = 1.841 | v20 = 25.0 |
| | r37 = ∞ | d37 = 11.42 | | |

TABLE 3-continued

NUMERICAL EXAMPLE 3

Unit distance in magnification variations (mm) (2050 mm)

| Unit distance | Wide-angle | Telephoto |
|---|---|---|
| d10 | 48.28 | 3.60 |
| d12 | 1.50 | 33.91 |
| d15 | 2.99 | 13.04 |
| d17 | 38.79 | 2.96 |
| d18 | 2.91 | 13.32 |
| d22 | 13.02 | 0.50 |
| d28 | 0.50 | 25.70 |
| d32 | 2.00 | 16.96 |

(B) Aspherical Coefficient

| | K | A | B | C |
|---|---|---|---|---|
| r1 | 0 | 5.62775E−06 | −3.46421E−09 | 5.04723E−12 |
| r3 | 0 | −3.87324E−06 | 1.90376E−10 | 7.15252E−13 |

| | D | E | F | G |
|---|---|---|---|---|
| r1 | −6.63877E−15 | 8.32186E−18 | −6.41230E−21 | 2.40865E−24 |
| r3 | −1.37458E−15 | 0 | 0 | 0 |

(C) Values of Conditional Expressions

| (1) | 0.101 |
|---|---|
| (2) | −0.32 |
| (3) | −0.28 |
| (4) | 1.00 |

Reference Values

| $\varphi 1$ | −0.0143 |
|---|---|
| $\varphi 4$ | −0.013 |
| $\varphi w$ | 0.044 |
| $\varphi B4\ r1$ | 0.0044 |
| n | 1.717 |
| Fnow | 2.40 |
| Fnot | 2.40 |

Figure 10:
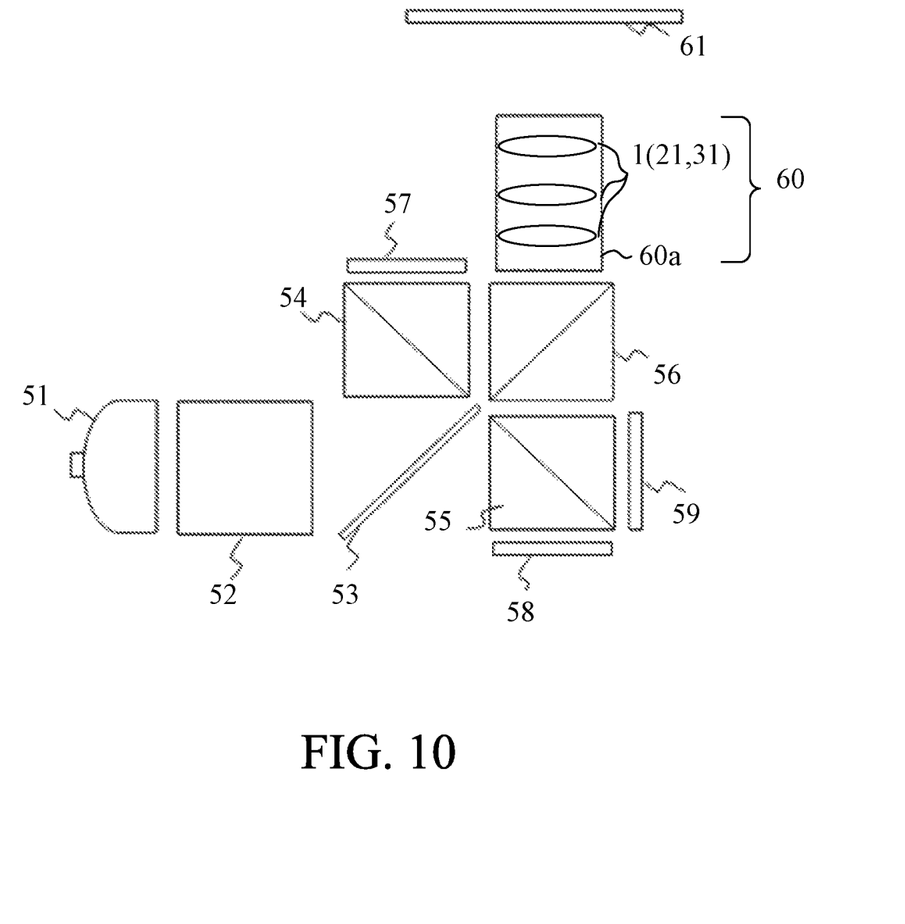
FIG. 10 is a sectional view of a structure of a projector using the zoom lens according to the first to third embodiment for a projection lens.

FIG. 10 illustrates a configuration of an image projection apparatus (projector) that uses a zoom lens according to each embodiment for a projection lens. An illumination optical system 52 converts light from a light source 51 into linearly polarized light, and leads the linearly polarized light to three light modulation elements 57, 58, and 59 with even intensities. A color separating/combining optical system includes a dichroic mirror 53 and polarization beam splitters 54 and 55, separates white light from the light source 51 into red light, green light, and blue light, and guides these colored light fluxes to the light modulation elements 57, 58, and 59. Each light modulation element is driven in accordance with an external image signal, and modulates and reflects incident colored light.

The color separating/combining optical system combines the red light, the green light, and the blue light modulated by the light modulation elements 57, 58, and 59, and led to the color combining prism 56 by the polarization beam splitters 54 and 55, and guides the combined light to a projection lens 60. The projection lens 60 is a zoom lens (1, 21, and 31) described in each embodiment and held by a lens barrel 60a. The projection lens 60 enlarges and projects the combined light from the color combining prism 56 to a target plane 61, such as a screen. Thereby, a color projected image is displayed on the target plane 61.

When the projection lens 60 uses the zoom lens according to each embodiment, the projected image can be displayed in which an aberration is well corrected with a high resolution.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-132433, filed on Jul. 6, 2017, which is hereby incorporated by reference herein in its entirety.

What is claimed is:

1. A zoom lens comprising a plurality of lens units, in which a distance between adjacent lens units is variable in a magnification variation,
   wherein the plurality of lens units include, in order from an enlargement conjugate side to a reduction conjugate side, a first lens unit that has a negative refractive power and that is fixed for the magnification variation, a second lens unit, a third lens unit, a fourth lens unit, a fifth lens unit, a sixth lens unit, and a seventh lens unit, each of which moves for the magnification variation, and an eighth lens unit that has a positive refractive power and that is fixed for the magnification variation.

2. The zoom lens according to claim 1, further comprising a stop between the fourth lens unit and the fifth lens unit.

3. The zoom lens according to claim 1, wherein the second lens unit has a positive refractive power, the third lens unit has a positive refractive power, and the fourth lens unit has a negative refractive power.

4. The zoom lens according to claim 1, wherein for the magnification variation from a wide-angle side to a telephoto side, the second and third lens units move to the enlargement conjugate side and the fourth lens unit moves to the reduction conjugate side.

5. The zoom lens according to claim 1, wherein each of the fifth lens unit and the seventh lens unit has a positive refractive power, and the sixth lens unit has a positive or negative refractive power.

6. The zoom lens according to claim 1, wherein the following condition is satisfied, $$-0.2 \leq \varphi B4r1/\varphi w \leq 0.3$$

where $\varphi w$ is a refractive power of an overall zoom lens system at a wide-angle end, and $\varphi B4r1$ is a refractive power of a lens surface closest to the enlargement conjugate side in the fourth lens unit.

7. The zoom lens according to claim 1, wherein the following condition is satisfied, $$-0.7 \leq \varphi 1/\varphi w \leq -0.1$$

where $\varphi w$ is a refractive power of an overall zoom lens system at a wide-angle end, and $\varphi 1$ is a refractive power of the first lens unit.

8. The zoom lens according to claim 1, wherein the following condition is satisfied, $$-0.6 \leq \varphi 4/\varphi w < 0$$

where $\varphi w$ is a refractive power of an overall zoom lens system at a wide-angle end, and $\varphi 4$ is a refractive power of the fourth lens unit.

9. The zoom lens according to claim 1, wherein the following condition is satisfied, $$0.8 \leq Fnot/Fnow \leq 1.2$$

where Fnow is a F-number of the zoom lens at a wide-angle end, and Fnot is a F-number of the zoom lens at a telephoto end.

10. The zoom lens according to claim 1, wherein the fourth lens unit includes one negative lens.

11. The zoom lens according to claim 1, further comprising a barrel configured to hold the plurality of lens units.

12. An image projection apparatus comprising:
a light modulation element configured to modulate light; and
a zoom lens comprising a plurality of lens units, in which a distance between adjacent lens units is variable in a magnification variation,
wherein the plurality of lens units include, in order from an enlargement conjugate side to a reduction conjugate side, a first lens unit that has a negative refractive power and that is fixed for the magnification variation, a second lens unit, a third lens unit, a fourth lens unit, a fifth lens unit, a sixth lens unit, and a seventh lens unit, each of which moves for the magnification variation, and an eighth lens unit that has a positive refractive power and that is fixed for the magnification variation.

* * * * *